United States Patent [19]
Khalifa et al.

[11] Patent Number: 5,417,452
[45] Date of Patent: May 23, 1995

[54] STEERING COLUMN ENERGY ABSORBING ASSEMBLY

[75] Inventors: Mustafa A. Khalifa, Dearborn; Kenneth Budowick, Warren, both of Mich.

[73] Assignee: Chrysler Corporation, Highlan Park, Mich.

[21] Appl. No.: 143,776

[22] Filed: Nov. 1, 1993

[51] Int. Cl.⁶ ............................................. B62D 1/11
[52] U.S. Cl. .................... 280/777; 74/492; 188/371
[58] Field of Search ............ 280/777; 74/492, 493; 188/371, 373

[56] References Cited

U.S. PATENT DOCUMENTS

| | | | |
|---|---|---|---|
| 3,556,550 | 1/1917 | Franchini | 280/777 |
| 3,843,348 | 7/1975 | Rieth et al. | 74/492 |
| 4,228,695 | 10/1980 | Trevisson et al. | 188/371 X |
| 4,718,296 | 1/1988 | Hyodo | 280/777 X |
| 4,901,592 | 2/1990 | Ito et al. | 188/371 X |
| 5,024,118 | 6/1991 | Khalifa et al. | 74/492 |
| 5,026,092 | 6/1991 | Abramczyk | 74/492 |
| 5,181,435 | 1/1993 | Khalifa et al. | 74/492 |

FOREIGN PATENT DOCUMENTS 0245612  11/1987  European Pat. Off. ............ 74/492

Primary Examiner—Margaret A. Focarino
Assistant Examiner—Christopher Ellis
Attorney, Agent, or Firm—Edward A. Craig

[57] ABSTRACT

A steering column assembly for a motor vehicle comprises an elongated steering column extending upwardly and rearwardly with respect to the vehicle. The steering column is of a type which rises to a greater angle to the horizontal when the vehicle is involved in a head-on collision. The steering wheel/air bag assembly at the upper end of the steering column is placed at an unfavorable position with respect to the driver's chest when the steering column rises in a collision. The steering column is mounted so that it will incline further upwardly when the driver is thrown forwardly during the collision and his chest strikes the steering wheel/air bag assembly. An energy absorbing bracket is provided to resist and retard the further upward inclination of the steering column in order to ease and soften the impact on the driver. The steering column is composed of a lower section and an upper section arranged end-to-end. The upper section is adapted to incline upwardly relative to the lower section in a vehicle frontal impact when the driver is thrown forwardly against the steering wheel. An energy absorbing device resists and retards such upward inclination of the upper section in order to ease and soften the impact on the driver.

3 Claims, 4 Drawing Sheets

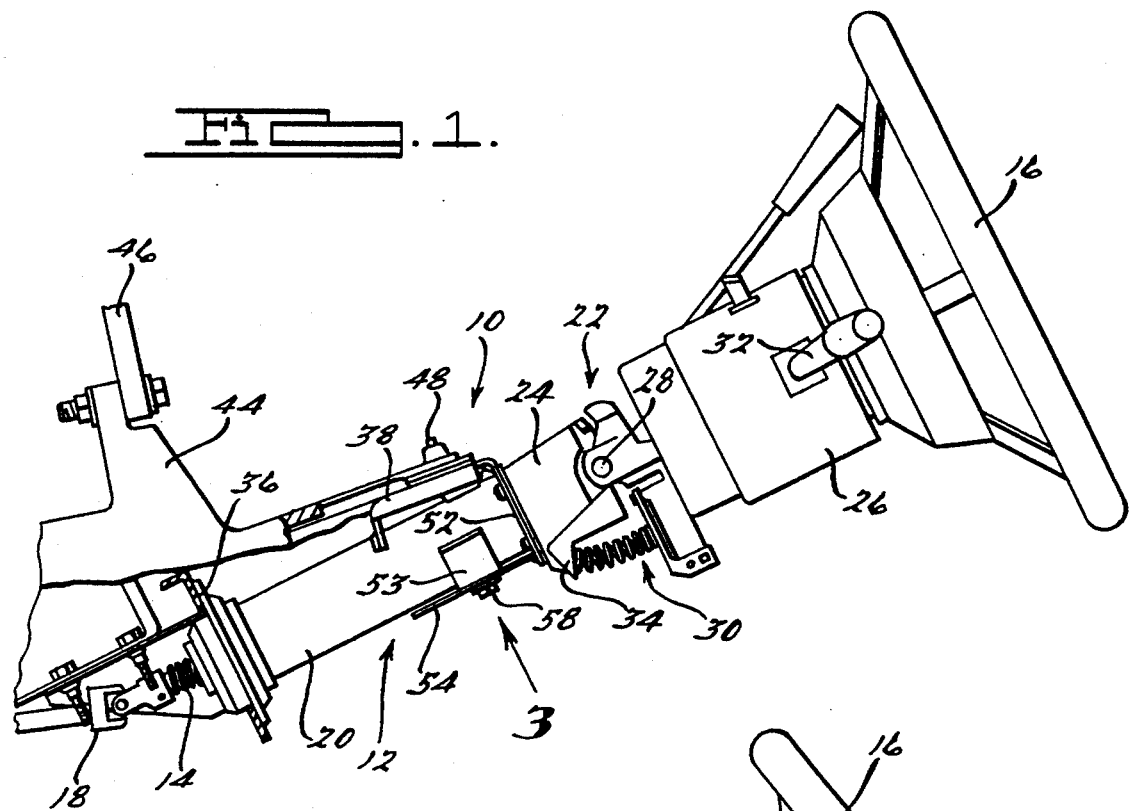
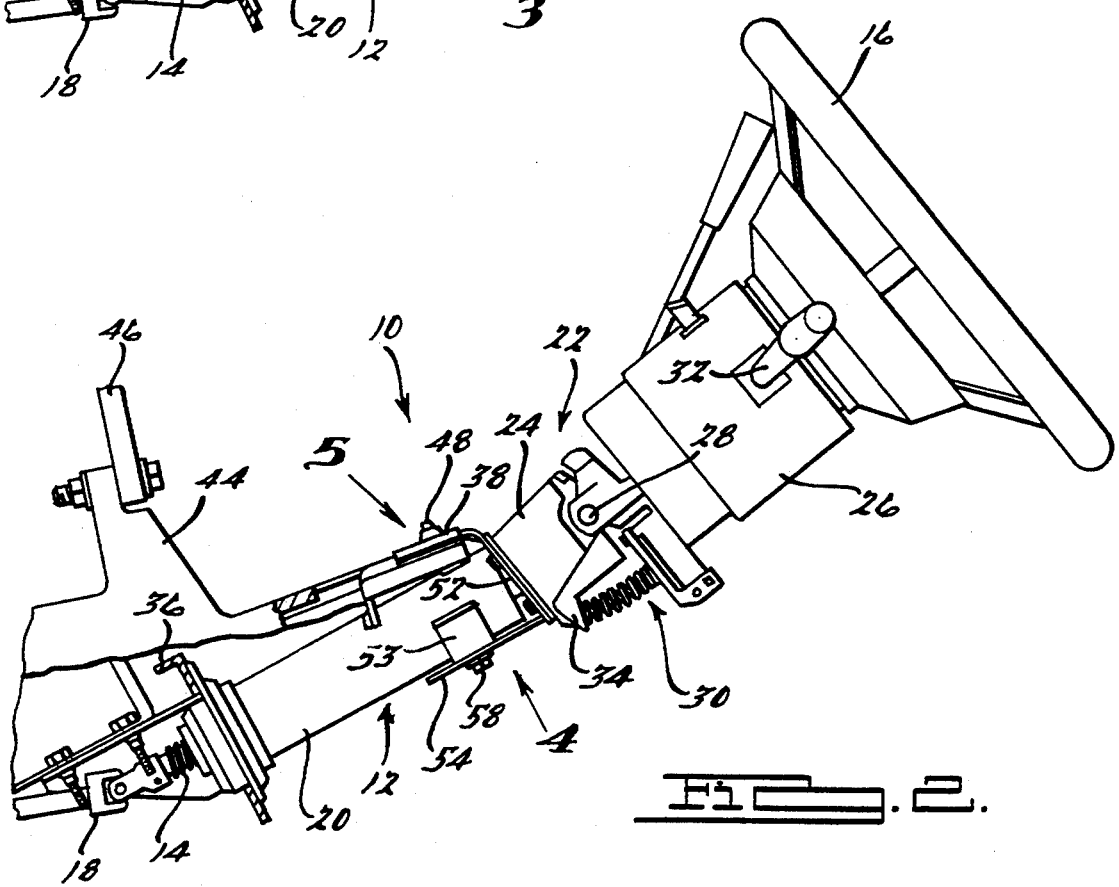

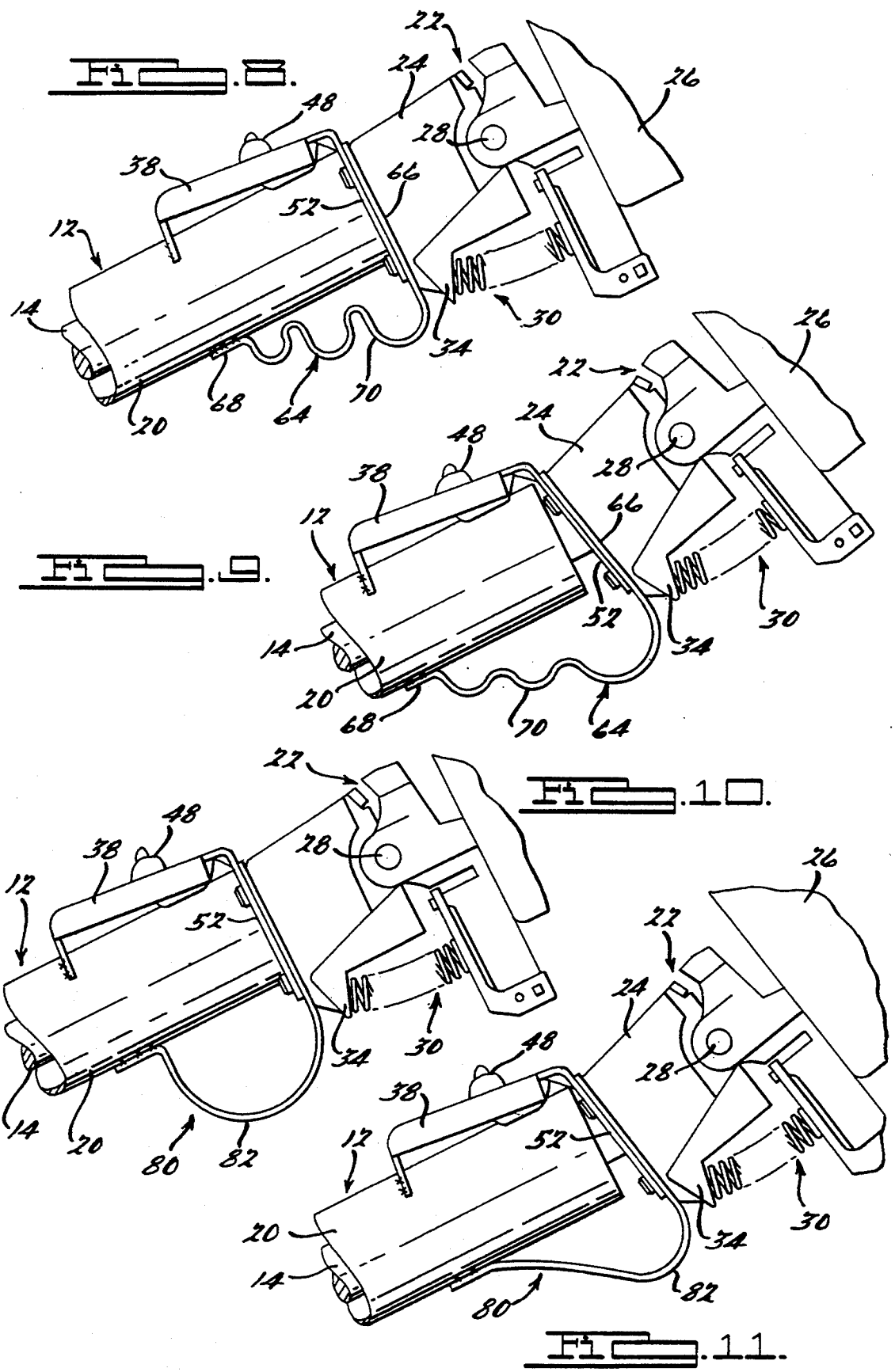

STEERING COLUMN ENERGY ABSORBING ASSEMBLY

This invention relates generally to steering columns for automotive vehicles and refers more particularly to a steering column energy absorbing assembly.

BACKGROUND AND SUMMARY

Most steering columns rise when a vehicle is involved in a frontal impact. In other words, the steering column which normally is inclined upwardly and rearwardly at a predetermined angle, will rise to a greater angle upon frontal impact. This is caused by the vehicle engine being thrust rearwardly.

The rise in the steering column places the steering wheel/air bag assembly in an unfavorable position with respect to the driver's chest. When the-driver's chest comes in contact with the steering wheel/air bag assembly, the force against this assembly has a considerable off-axis bending component which is increased due to the rise in the steering column. If the rise in the steering column is such that the off-axis component of force on the steering wheel/air bag assembly acts above the center of mass of the driver's chest, then the driver tends to "submarine" or dive under the steering wheel, creating an even less favorable situation.

The steering column of this invention has a cross member or bracket which mounts the steering column to the vehicle frame. This bracket is slotted and notched to reduce its resistance to bending. When the steering column tilts up in a front end collision, the force of the driver upon being thrown forward against the steering wheel/air bag assembly will cause the bracket to bend and the steering column to tilt upwardly further. As a result, energy is absorbed and the impact on the driver is reduced.

Further in accordance with the invention, the steering column is made in two sections, an upper section and a lower section. The upper section is adapted to incline further upwardly when the driver is thrown forward against the steering wheel/air bag assembly. An energy absorbing device resisting and retarding such further upward inclination of the upper section is provided to reduce the impact on the driver.

As shown in certain specific embodiments about to be described, this energy absorbing device may take the form of a pair of plates held together under pressure in frictional sliding contact, or a strap of relatively stiff bendable material curved preferably either to arcuate or sinuous form and capable of opening up under stress. These energy absorbing devices retard and resist any further upward inclination of the upper section relative to the lower section and thereby reduce the reaction force or impact on the driver. The cross member or bracket which mounts the steering column to the frame preferably is secured to the lower section of the steering column and has a bendable flange connected to the upper section which resists and retards upward inclination of the upper section to further reduce the reaction force on the driver when his chest hits the steering wheel.

It is an object of this invention to provide a steering column energy absorbing assembly having the foregoing features.

Other objects are to provide a steering column energy absorbing assembly which is rugged and durable in use, composed of a relatively few simple parts, and capable of being readily and inexpensively manufactured.

Other objects, features and advantages of the invention will become more apparent as the following description proceeds, especially when considered with the accompanying drawings.

BRIEF DESCRIPTION OF THE DRAWINGS

FIG. 1 is a side elevational view of a steering column energy absorbing assembly constructed in accordance with the invention.

FIG. 5 is a fragmentary view in perspective as seen looking in the direction of the arrow 5 in FIG. 2.

FIG. 8 is a fragmentary side elevational view showing a second embodiment of the energy absorbing device.

FIG. 9 is similar to FIG. 8 but shows the condition of the energy absorbing device after impact and when the upper section of the steering column has been tilted upwardly.

FIG. 10 is a fragmentary side elevational view showing another embodiment of the energy absorbing device.

FIG. 11 is similar to FIG. 10 but shows the condition of the energy absorbing device when the upper section of the steering column has tilted upwardly relative to the lower section.

DETAILED DESCRIPTION

Figure 2:
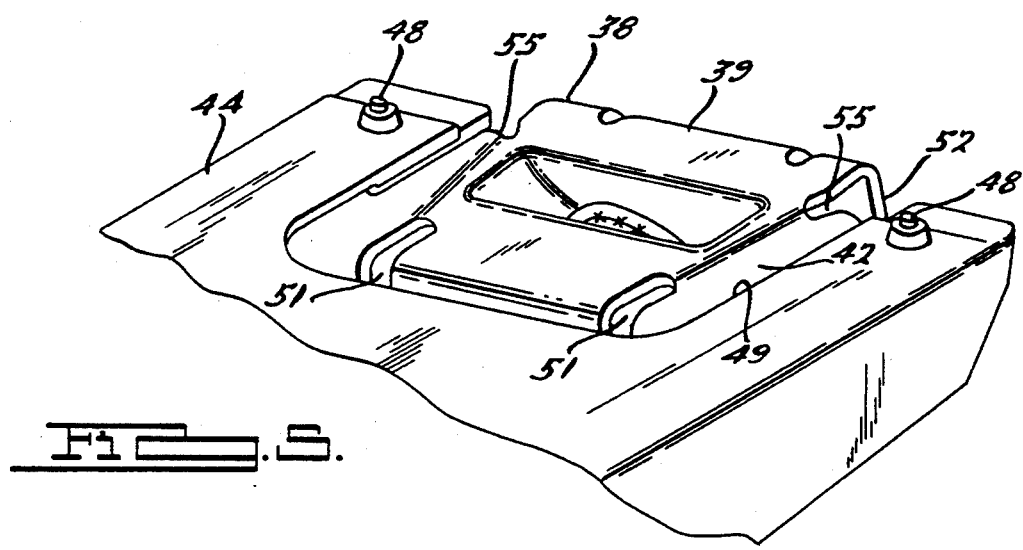
FIG. 2 is a view similar to FIG. 1, but shows the upper section of the steering column tilted upwardly relative to the lower section.
Figure 3:
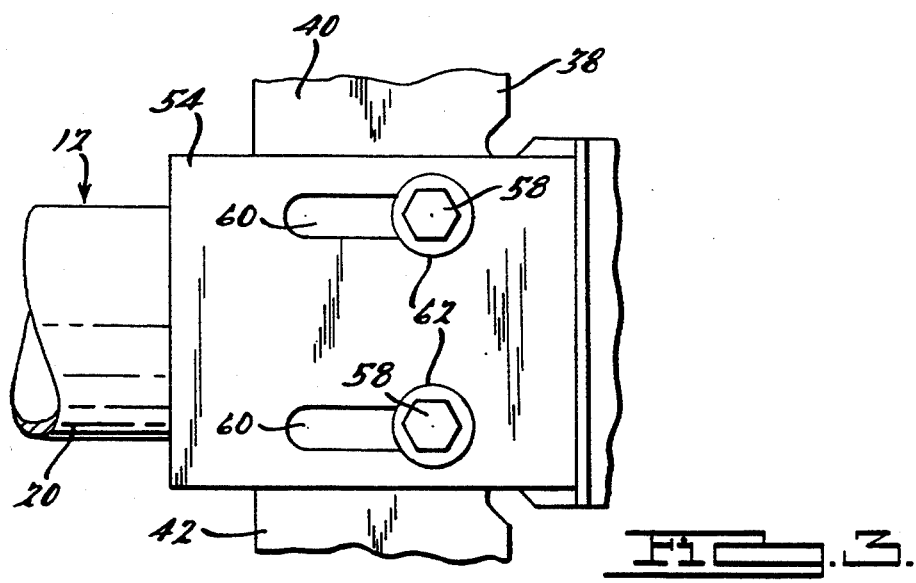
FIG. 3 is a fragmentary view of one embodiment of an energy absorbing device, looking in the direction of the arrow 3 in FIG. 1.
Figure 4:
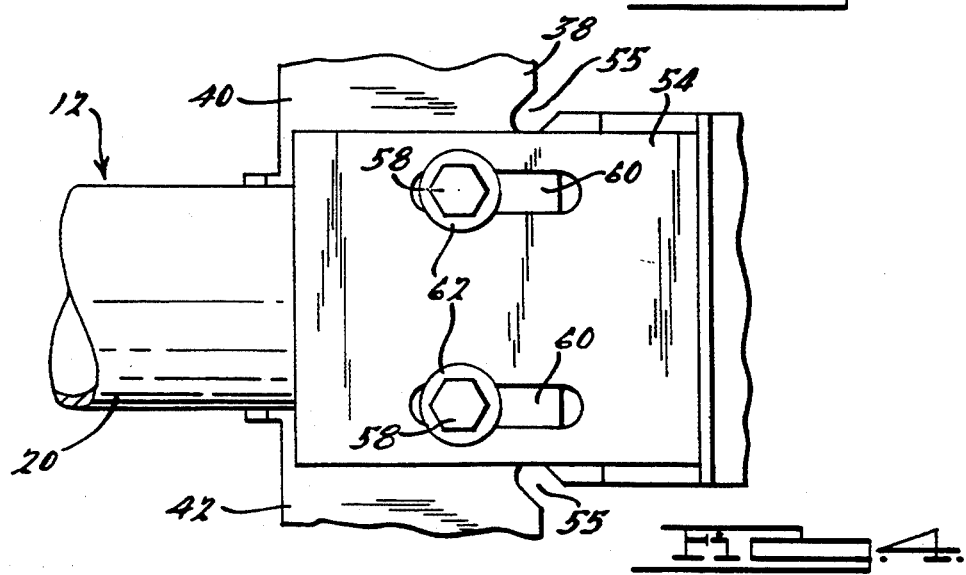
FIG. 4 is a view similar to FIG. 3 looking in the direction of the arrow 4 in FIG. 2, showing the position of the parts of the energy absorbing device when the upper section of the steering column is tilted upwardly relative to the lower section.
Figure 6:
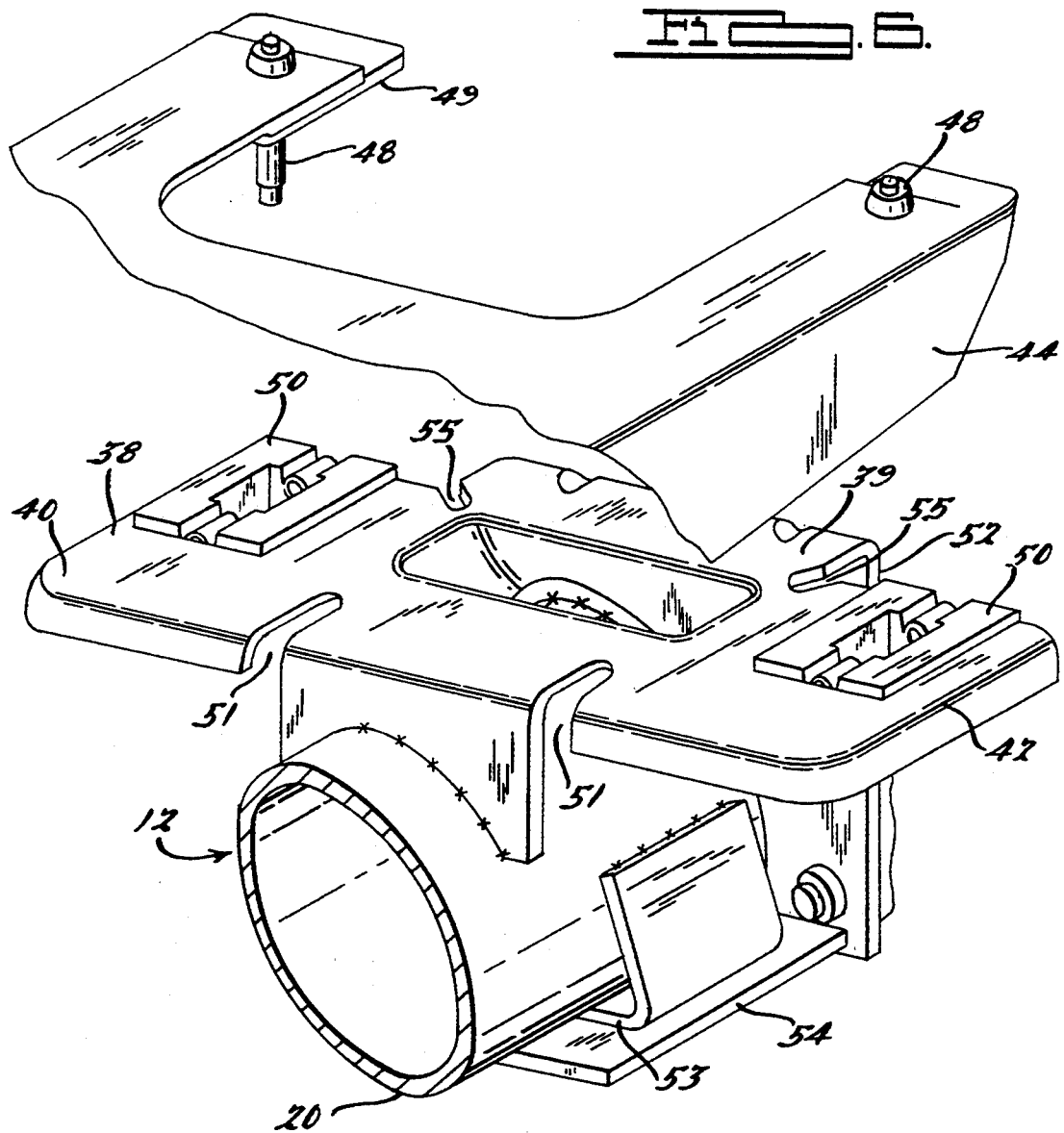
FIG. 6 is an exploded fragmentary view of the parts in FIG. 5 in which the cross member or bracket on the steering column is shown slotted to increase its ability to bend under the force of a frontal impact when the steering column tends to rise, and also showing the casting to which the bracket is secured.
Figure 7:
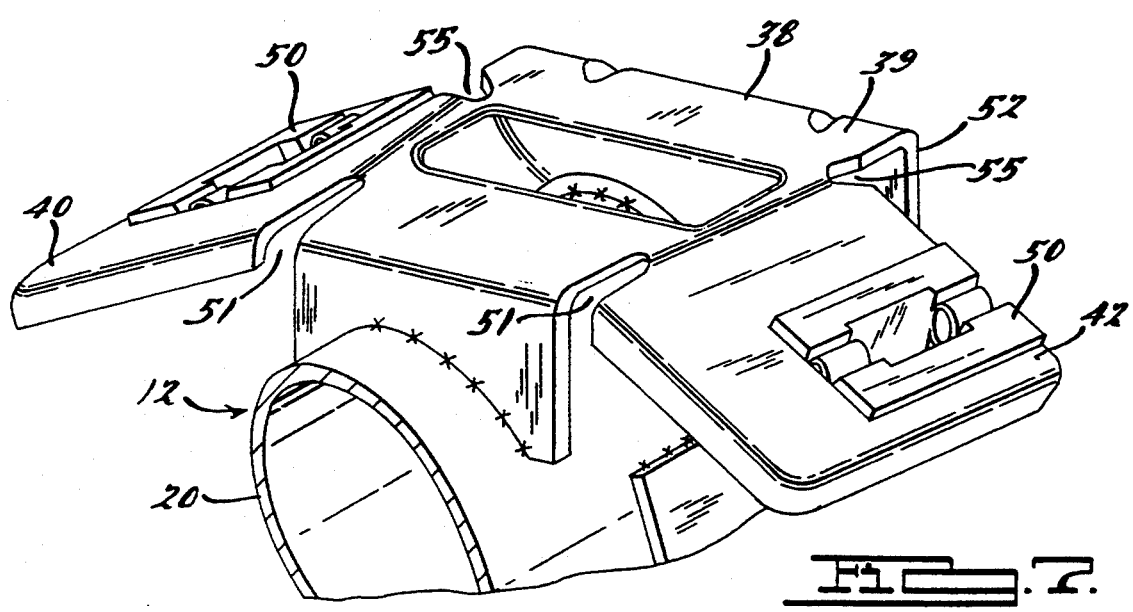
FIG. 7 is a perspective view showing the bracket in a bent condition after a rise in the steering column in response to a frontal impact.

Referring now more particularly to the drawings and especially to FIGS. 1-7, a steering column assembly 10 has an elongated tubular steering column 12 which extends at an angle to the horizontal upwardly and rearwardly in relation to the motor vehicle. The steering column 12 will rise, that is its angle to the horizontal will increase, upon frontal impact.

A steering shaft 14 extends through the tubular steering column 12 and is connected to a steering wheel/air bag assembly 16 at the upper end and to a shaft coupler 18 at the lower end. The shaft coupler is operatively connected to a steering gear assembly (not shown) to steer the front wheels of the vehicle.

The steering column 12 has an elongated lower section 20 and an elongated upper section 22 extending the end-to-end continuation of one another. The upper section 22 has a bottom part 24 and an upper part 26 connected together for pivotal movement by pivot means in the form of a horizontal transverse pin 28. A tilt mechanism 30 is provided, including a control lever 32 and a latch device 34, for locking the upper part 26 to the bottom part 24 in angularly adjusted position.

The lower end portion of the lower section 20 of the steering column is rigidly attached to vehicle support structure 36. Near its upper end, the lower section 20 has a cross member or bracket 38 the mid-portion 39 of which is rigidly secured thereto. Bracket 38 has wings 40 and 42 which are connected to a casting 44 secured to vehicle support structure 46. More specifically, the wings 40 and 42 of the bracket are secured to the casting by bolts 48 which thread into clips 50 carried by the wings. The bracket 38 is made of a relatively stiff material, but is slotted at 51 and notched at 55 to make it more flexible so that the wings 40, 42 will bend down as in FIG. 7 when the steering wheel/air bag assembly is struck by the driver's chest and allow the steering column to tilt further upwardly and thereby absorb energy and reduce the impact on the driver. The casting 44 is cut away to provide a clearance 49 for the mid-portion 39 of the bracket when the steering column tilts upwardly.

A flange 52 extends from the mid-portion 39 of the bracket and is rigidly secured to the bottom surface of the bottom part 24 of the upper section 22 of the steering column.

The upper and lower sections 20 and 22 of steering column 12 are held together in alignment by clamping plates 53 and 54. The clamping plate 53 is rigidly secured to the underside of the lower section 20 near its upper end. The plate 54 is disposed in surface-to-surface frictional sliding contact with the undersurface of the plate 53 and is rigidly secured to the flange 52 of bracket 38. Bolts 58 threaded to the plate 53 extend through elongated longitudinally extending slots 60 in the plate 54. The heads 62 of the bolts clamp the plates 53 and 54 together under predetermined pressure to frictionally resist relative sliding movement.

FIG. 1 shows the lower and upper sections 20 and 22 in alignment. This is the normal operating condition of the parts. In the event of a front end collision and the driver is thrown forward causing his chest to strike the bottom of the steering wheel/air bag assembly, the upper section 22 of the steering column will tend to incline upwardly further, but this movement is resisted and retarded by the plates 53 and 54 which slide relative to one another until the upper section assumes the position in FIG. 4.

The flange 52 of bracket 38 on the lower section 20 of the steering wheel/air bag assembly 16 bends when the upper section 22 of the steering column 12 tilts upwardly relative the lower section 20 in response to the driver's chest striking the steering wheel/air bag assembly, absorbing energy and adding to the retardation in such upward tilting and easing or softening the impact on the driver.

FIGS. 8 and 9 show a modification in which the sections 20 and 22 of the steering column 12 are held together by a single elongated strap 64, instead of by plates 53 and 54. The strap 64 is made of relatively stiff, bendable, flexible strip material of spring steel, for example. One end portion 66 is rigidly secured to the bottom face of the bottom part 24 of the upper section 22. The other end 68 is rigidly secured to the lower section 20 near to but spaced from the upper end thereof. The mid-portion 70 is folded to a sinuous form in its natural, unstressed condition. When the driver is thrown forward against the steering wheel/air bag assembly in a frontal impact, the tendency of the upper section 22 of the steering column to tilt upwardly relative to the lower section 20 will be resisted and retarded by the unfolding and straightening of the mid-portion 70 to the FIG. 9 position. The flange 52 also aids in retarding the upward tilt.

The modification shown in FIGS. 10 and 11 shows a strap 80 which is similar to the strap 64 except that the mid-portion 82 thereof has but a single fold in its natural, unstressed condition, and is in the form of a half-circular arc that unfolds under stress to the FIG. 11 position.

The plates 53, 54 and the straps 64 and 80 are energy absorbing devices which reduce or ease and soften the force of impact on the driver when his chest hits the steering wheel/air bag assembly in a head-on collision. The slotted and notched wings 40, 42 of the bracket 38 and the bracket flange 52 also serve as energy absorbing devices.

What is claimed is:

1. A steering column assembly of a vehicle comprising an elongated steering column extending upwardly and rearwardly with respect to the vehicle, said steering column having a lower section, an upper section extending adjacently in an end-to-end continuation of said lower section and having an upper end, a steering wheel on said upper end, pivot means connecting said upper and lower sections whereby said upper section is adapted to incline further upwardly relative to said lower section in a vehicle frontal impact when the driver of the vehicle is thrown forward against the steering wheel, and an energy absorbing device extending between said upper and lower sections and resisting and retarding said further upward inclination of said upper section to ease the impact upon the driver, said energy absorbing device comprising first and second plates secured to the respective adjacent end portions of said lower and upper sections of said steering column and disposed in surface-to-surface frictional sliding contact with each other, and means for clamping said plates together with a predetermined pressure to resist sliding of said plates relative to each other.

2. A steering column assembly as defined in claim 1, wherein said clamping means comprises a bolt connected to one of said plates, a slot in the other of said plates which is elongated in the direction of the sliding movement and through which said bolt extends, said bolt having a head overlying and imposing the clamping pressure on said other plate.

3. A steering column assembly as defined in claim 1, and further including means for resisting and retarding further upward inclination of the entire steering column when the driver is thrown forwardly in a vehicle frontal impact comprising a bracket connecting the lower section of said steering column to vehicle support structure, said bracket being constructed and arranged to bend and allow a gradual upward tilt of said steering column.

* * * * *